US 8,156,244 B2

Apr. 10, 2012

(12) United States Patent
Blair

(10) Patent No.: US 8,156,244 B2
(45) Date of Patent: Apr. 10, 2012

(54) SOFTWARE CLIENT CONTROL OF DIGITAL PICTURE FRAMES

(75) Inventor: Christopher Blair, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 355 days.

(21) Appl. No.: 12/125,341

(22) Filed: May 22, 2008

(65) Prior Publication Data

US 2009/0292822 A1 Nov. 26, 2009

(51) Int. Cl.
*G06F 15/173* (2006.01)
(52) U.S. Cl. ........ 709/238; 709/200; 709/240; 709/231; 348/500; 348/739; 348/E5.009; 348/E5.133
(58) Field of Classification Search .................. 709/238, 709/240, 231, 200; 348/500, 739, E5.009, 348/E5.133
See application file for complete search history.

(56) References Cited

U.S. PATENT DOCUMENTS

| | | | | |
|---|---|---|---|---|
| 6,012,099 | A * | 1/2000 | Chung | 709/249 |
| 6,748,434 | B2 * | 6/2004 | Kavanagh | 709/224 |
| 6,961,046 | B2 | 11/2005 | Bowden, III et al. | |
| 6,975,308 | B1 | 12/2005 | Bitetto et al. | |
| 7,038,728 | B2 | 5/2006 | Kim et al. | |
| 7,082,398 | B1 * | 7/2006 | Apple et al. | 705/1 |
| 7,190,686 | B1 * | 3/2007 | Beals | 370/337 |
| 7,376,696 | B2 * | 5/2008 | Bell et al. | 709/203 |
| 7,426,532 | B2 * | 9/2008 | Bell et al. | 709/201 |
| 2001/0041072 | A1 * | 11/2001 | Takano | 396/429 |
| 2002/0071139 | A1 * | 6/2002 | Janik | 358/1.15 |
| 2002/0186768 | A1 * | 12/2002 | Dimitrova et al. | 375/240.12 |
| 2003/0188041 | A1 * | 10/2003 | Fillmore | 709/318 |
| 2004/0044725 | A1 * | 3/2004 | Bell et al. | 709/203 |
| 2004/0198401 | A1 * | 10/2004 | Rodgers et al. | 455/502 |
| 2005/0102699 | A1 * | 5/2005 | Kim et al. | 725/81 |
| 2005/0267928 | A1 * | 12/2005 | Anderson et al. | 709/200 |
| 2006/0212514 | A1 * | 9/2006 | Saillet | 709/203 |
| 2006/0248192 | A1 * | 11/2006 | Morris et al. | 709/226 |
| 2007/0123174 | A1 * | 5/2007 | Wiessner et al. | 455/73 |
| 2007/0130593 | A1 * | 6/2007 | Choi et al. | 725/81 |
| 2007/0140239 | A1 * | 6/2007 | Bauer et al. | 370/389 |
| 2007/0171910 | A1 * | 7/2007 | Kumar | 370/392 |
| 2007/0288618 | A1 * | 12/2007 | Yeo et al. | 709/223 |
| 2007/0291153 | A1 | 12/2007 | Araki et al. | |
| 2008/0084361 | A1 * | 4/2008 | Ueta et al. | 345/7 |
| 2008/0095148 | A1 * | 4/2008 | Hegde | 370/360 |
| 2008/0189766 | A1 * | 8/2008 | Bell et al. | 726/3 |
| 2008/0218493 | A1 * | 9/2008 | Patten et al. | 345/173 |

(Continued)

OTHER PUBLICATIONS

U.S. Appl. No. 12/050,536, filed Mar. 18, 2008, Ganzaroli, Fabio Marco.

*Primary Examiner* — John Follansbee
*Assistant Examiner* — Anthony Mejia
(74) *Attorney, Agent, or Firm* — Fish & Richardson P.C.

(57) ABSTRACT

In one embodiment, a method can include: determining a topology of digital picture frames in a frame network; identifying a lead picture frame from among the digital picture frames; sending the digital picture frame topology to a client coupled to the lead picture frame; receiving in the lead picture frame and from the client, media content for display on a destination digital picture frame in the frame network; and routing the received media content to the destination digital picture frame using router functionality in at least one of the plurality of digital picture frames.

20 Claims, 8 Drawing Sheets

U.S. PATENT DOCUMENTS

| | | | |
|---|---|---|---|
| 2008/0228569 A1* | 9/2008 | Yankiver | 705/14 |
| 2008/0310763 A1* | 12/2008 | Senoo | 382/305 |
| 2009/0006635 A1* | 1/2009 | Siegmund | 709/228 |
| 2009/0167736 A1* | 7/2009 | Seydoux | 345/207 |
| 2009/0237325 A1* | 9/2009 | Luo et al. | 345/2.1 |
| 2009/0282098 A1* | 11/2009 | Karaoguz et al. | 709/203 |
| 2009/0295991 A1* | 12/2009 | Stafford et al. | 348/500 |
| 2009/0326684 A1* | 12/2009 | Wang et al. | 700/83 |
| 2010/0029253 A1* | 2/2010 | Han et al. | 455/414.2 |

* cited by examiner

SOFTWARE CLIENT CONTROL OF DIGITAL PICTURE FRAMES

TECHNICAL FIELD

The present disclosure relates generally to picture displays, and more specifically to controlling digital picture displays.

BACKGROUND

Some consumers of photo frames for displaying pictures prefer to arrange the frames on a wall, or along a mantle or shelf. Sometimes, particularly in large wall gallery arrangements, much time can be spent hanging and re-hanging the pictures to capture the desired effect. Also, personal taste may dictate that this change from time to time. With standard picture frames, the frames must be moved around, re-hung, or even opened up to change the contents thereof. Digital picture frames offer increased flexibility in terms of the displayed pictures, as typically provided via memory cards.

DETAILED DESCRIPTION OF EMBODIMENTS

Overview

In one embodiment, a method can include: determining a topology of digital picture frames in a frame network; identifying a lead picture frame from among the digital picture frames; sending the digital picture frame topology to a client coupled to the lead picture frame; receiving in the lead picture frame and from the client, media content for display on a destination digital picture frame in the frame network; and routing the received media content to the destination digital picture frame using router functionality in at least one of the digital picture frames.

In one embodiment, a digital picture frame can include: linking transceivers positioned within the digital picture frame, where the linking transceivers can determine a digital picture frame topology; an antenna for communication with a client when the digital picture frame is a lead picture frame; and a controller with router capability, where the controller is configured to: communicate with the linking transceivers for the determination of the digital picture frame topology; send the digital picture frame topology to the client when the digital picture frame is the lead picture frame; receive media content for display on the digital picture frame when the digital picture frame is a destination frame; and route the received media content to a second digital picture frame using the router capability when the second digital picture frame is the destination frame.

In one embodiment, an apparatus can include: one or more processors; and logic encoded in one or more tangible media for execution by the one or more processors, and when executed operable to: receive a topology of digital picture frames from a lead picture frame in a frame network; capture a digital picture for display in a representation of the digital picture frame topology; and send the digital picture for display on a destination digital picture frame in the frame network, where the digital picture is routed in the frame network to the destination digital picture frame.

Example Embodiments

Particular embodiments utilize available technology to provide for changing content (e.g., digital pictures, video streams, etc.) in an arrangement without having to move or open physical picture frames. This can be implemented using a simple and user-friendly software program from a personal computer (PC), laptop, or other suitable computing device.

In particular embodiments, a hardware component (e.g., an integrated digital frame) and a software component (e.g., a user client) can be configured to work together (e.g., in a home network environment, a "video wall" for digital signage or display, etc.). Hardware components included in digital picture frames can enable an arrangement of the frames to "auto-discover" each other, and to report this discovered topology to the software client. Controlling from the software client, a user can arrange photos, or otherwise change frame content without physical frame movement.

Figure 1:
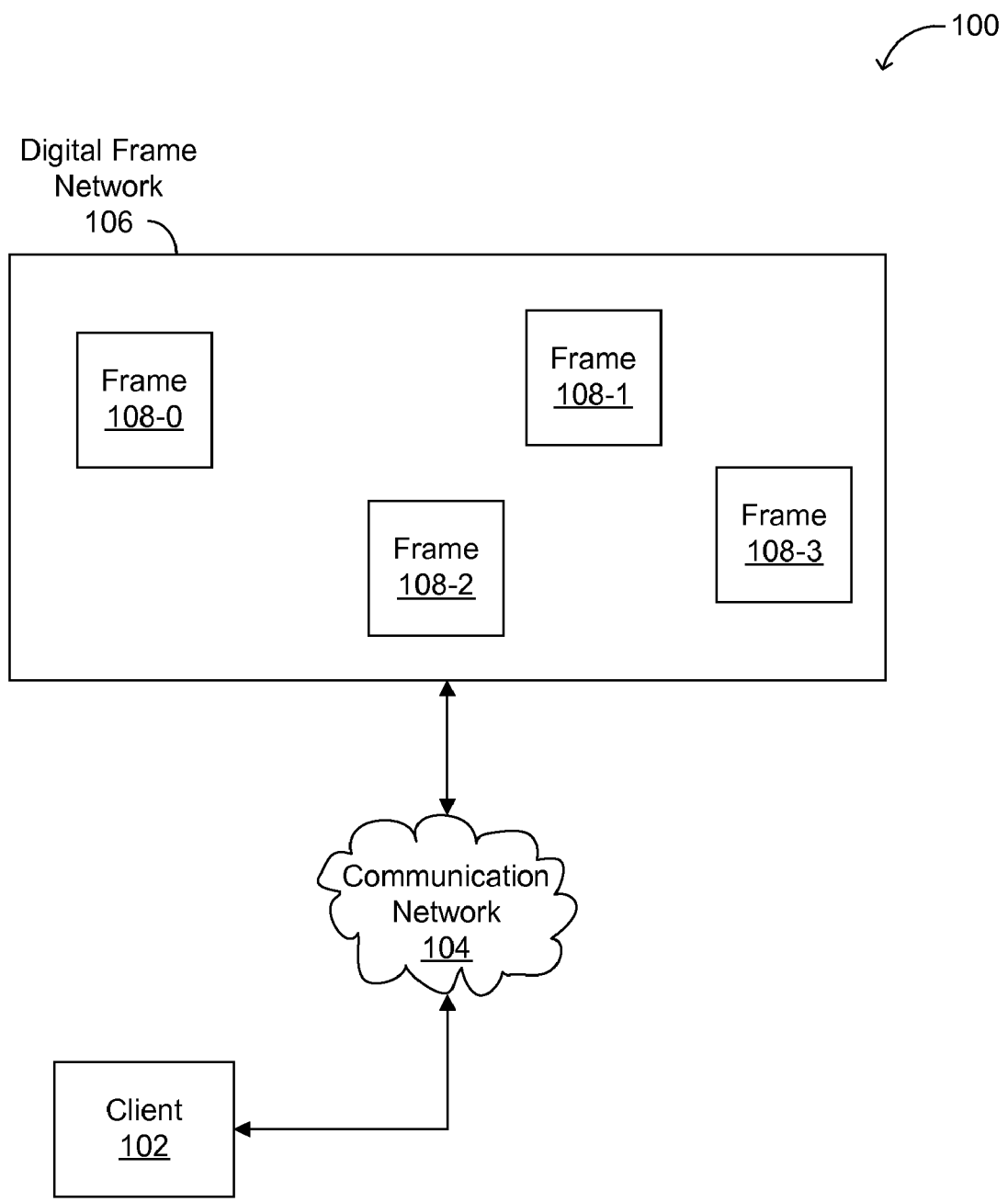
FIG. 1 illustrates an example remote client and video frame network arrangement.

Referring now to FIG. 1, an example remote client and video frame network arrangement is shown and indicated by the general reference character 100. Client 102 can interface via communication network 104 to digital frame network 106. For example, client 102 is software loaded on a laptop computer. Further, any suitable client and/or computing device (e.g., any portable computing device, cell phone, personal computer, etc.) can be utilized for client 102. Communication network 104 can be, e.g., the Internet, a virtual private network (VPN), a wireless network, or any network suitable for communication.

Digital frame network 106 can include digital frames 108-0, 108-1, 108-2, and 108-3. Any suitable number or arrangement of digital frames 108 can be accommodated in particular embodiments. For example, such frames may be arranged along a mantle or a wall in a house, or in a gallery, corporate office, etc. As another example, digital frame network 106 can form a video wall whereby each digital frame 108 is a sub-video wall portion. Particular embodiments include digital signage that is made aware of relative positions of other display portions (e.g., for individual frames or screens).

Figure 2:
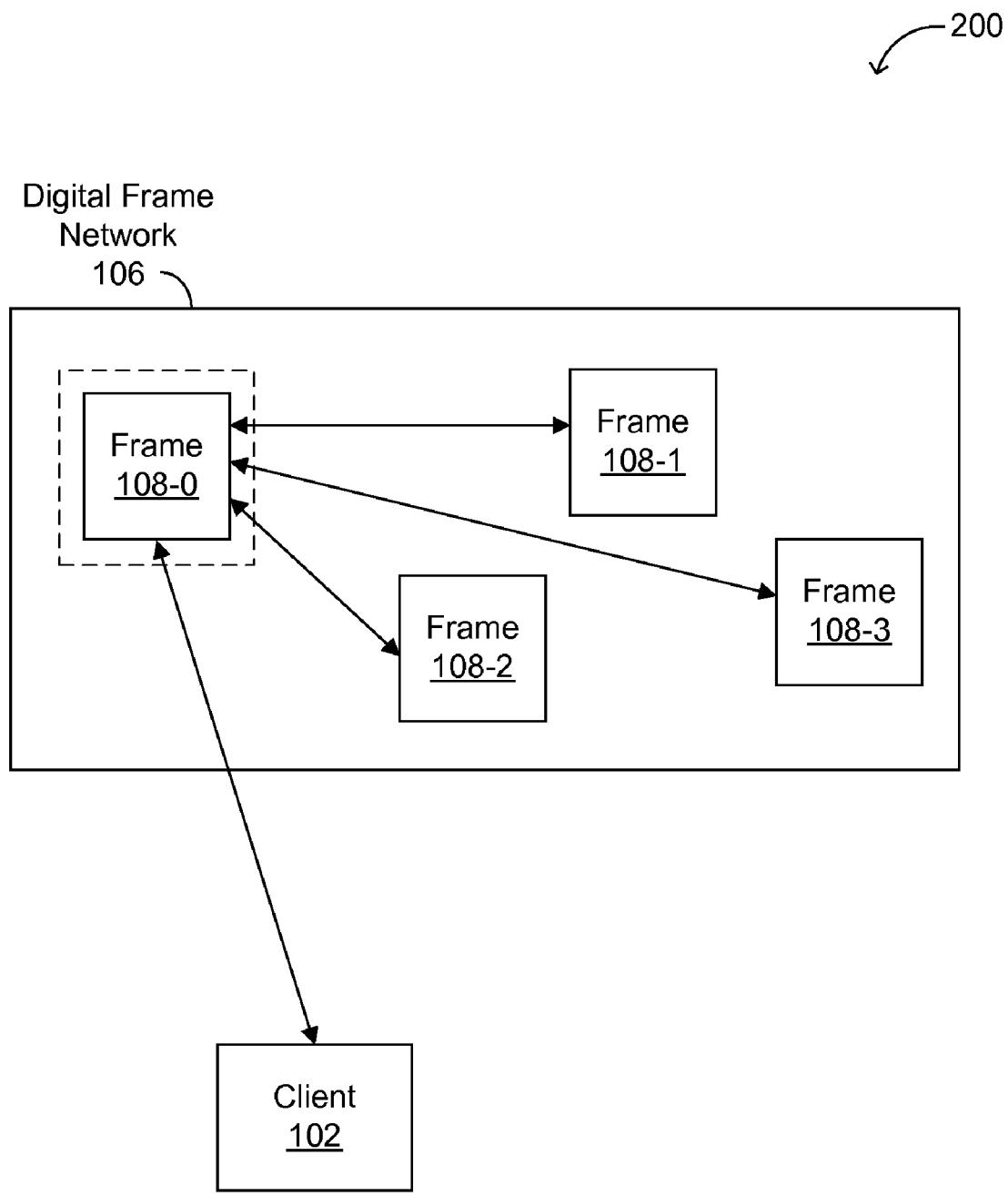
FIG. 2 illustrates an example lead frame designation and control.

Referring now to FIG. 2, an example lead frame designation and control is shown and indicated by the general reference character 200. In this example, digital frame 108-0 can be designated or otherwise selected as a "lead" frame. Such a lead frame can act as a main interface to client 102, as well as a controller for other frames (e.g., 108-1, 108-2, and 108-3). In particular embodiments, "auto" or "self" discovery is utilized to facilitate a digital frame arrangement or topology (e.g., of frames 108) determination. Such self-discovery in particular embodiments can be performed using a routing protocol (e.g., using proximity and direction determinations). As to video walls, individual frames or screens may also self-discover, as well as receive media content using a distributed Internet protocol (IP) digital receiver (e.g., in association with each frame 108).

A "lead" digital picture frame may be designated (e.g., a designated router) from among frames 108 in digital frame network 106, or such a leader may be automatically elected (e.g., based on a media access control (MAC) address of each frame 108). Thus, automatic or non-automatic (e.g., using designated switches) forms of self-discovery for frames 108 can be supported in particular embodiments. Software client 102 can include a laptop wirelessly coupled to lead frame 108-0. Once a frame topology is formed (e.g., after relocating and powering up frames) and lead frame 108-0 becomes aware of such, the frame topology may be reported to client 102. Client 102 can then generate a representation of each frame in relation to other frames found in digital frame network 106. In particular embodiments, communication between digital frame network 106 and client 102 can be via the lead frame (e.g., 108-0). However, certain embodiments can also employ parallel connections to communicate between each of frames 108 and client 102.

Another approach used to determine a lead frame in particular embodiments involves the inclusion of a switch (e.g., a dual in-line package (DIP) switch) in each digital picture frame for enabling the lead frame. The lead picture frame can thus be selected by a user flipping such an enable switch on one of the frames in the arrangement. In any event, the lead frame (e.g., 108-0) can function as a dynamic host configuration protocol (DHCP) server for the other frames (e.g., 108-1, 108-2, and 108-3), and as a point of contact with the software client 102. Setting such a lead frame enable switch can also enable another (e.g., non-directional) wireless Ethernet antenna on lead frame 108-0. Through this antenna, lead frame 108-0 can make contact with the client 102 (e.g., software running on a wireless PC or laptop).

Client 102 can also be wired to one or more frames 108 in digital frame network 106. In any event, particular embodiments can include an auto or self-discovery mechanism, whereby each digital picture frame exchanges MAC and IP addresses. As will be discussed below, wireless linking transceivers or sensors may be included on each edge, side, and/or corner of a digital picture frame, to allow the frame to operate in similar fashion as a wireless router (e.g., 802.11b/g, Ethernet connection, etc.).

Frame network topology provided via the lead frame (e.g., 108-0) to client 102 can include different frames 108, and information about the frames (e.g., aspect ratio, resolution, manufacturer, and video capabilities, etc.). Client 102 can accommodate drag and drop operations to map digital photos from a browser to particular frames represented in a topology view on the software client. Client 102 can accept a command to "push" the pictures up to corresponding physical frames in digital frame network 106. Content transport from client 102 to a destination frame can operate in similar fashion to routed data (e.g., over the Internet). Particular embodiments can also accommodate a wide variety of digital photography features (e.g., video, shuffling, slideshows, digital picture manipulation, etc.) in client 102.

Figure 3:
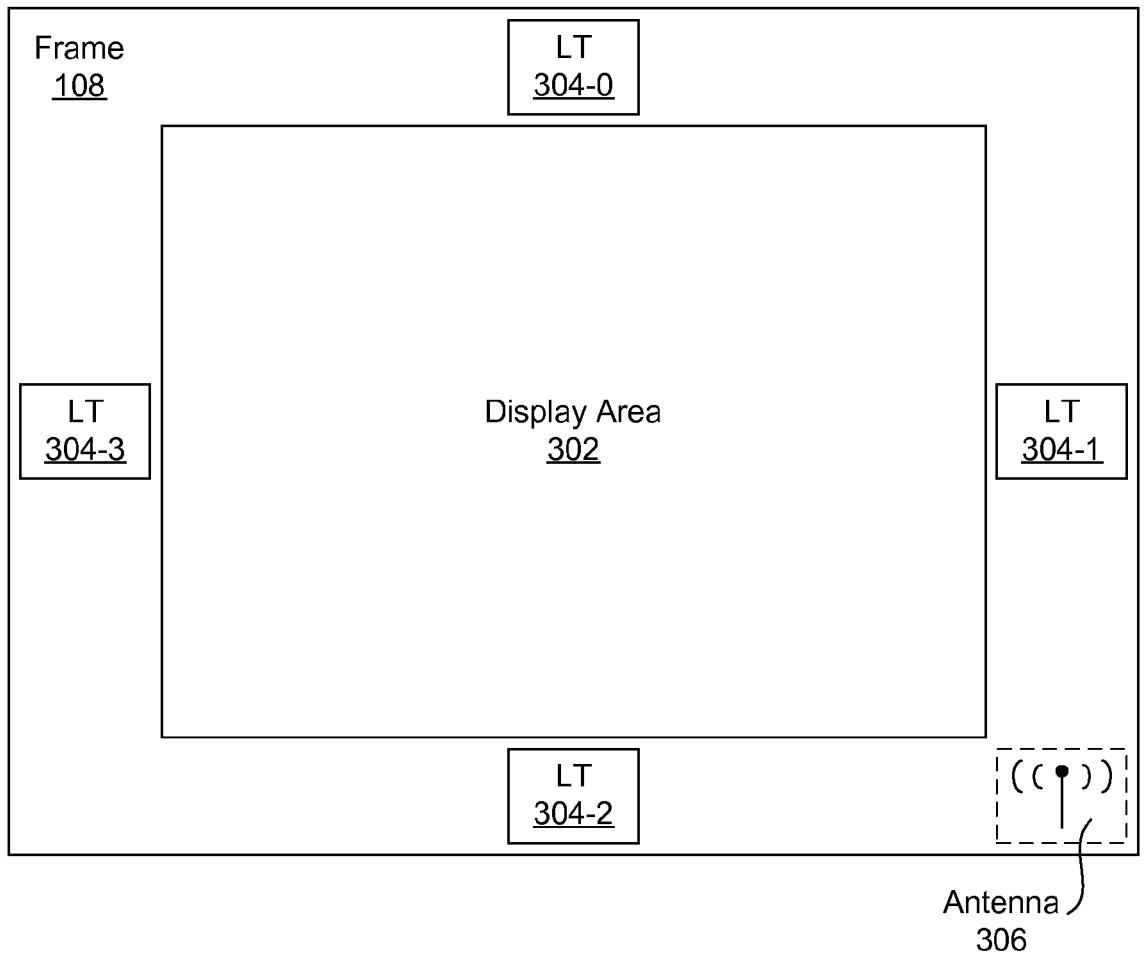
FIG. 3 illustrates an example wireless enabled digital picture frame.

Referring now to FIG. 3, shown is an example wireless enabled digital picture frame 108. Frame 108 can surround and underlie display area 302. For example, display area 302 is configured to display digital still pictures or video streams in any suitable aspect ratio. Frame 108 can include linking transceivers (LTs) 304-0, 304-1, 304-2, and 304-3, placed in any suitable locations around the frame. LTs 304 can include antennas (e.g., directional antennas) to be used in discovering and locating, as well as linking to, surrounding digital frames.

After a link is established, LTs 304 can form wireless interfaces. For example, each LT 304 includes a relatively low power antenna, uses a common protocol (e.g., wireless Ethernet, etc.) and is included in (e.g., embedded in each side of, coupled to each corner of, etc.) frame 108. Further, while four exemplary LTs are shown in this particular example, more than four LTs 304 can be included in any particular frame 108.

Antenna 306 can be included for communicating with client 102. Antenna 306 may also be configured to communicate with other devices, and in some particular cases, other frames 108. In particular embodiments, antenna 306 may be enabled in the lead picture frame for communication with client 102, and disabled in other frames in digital frame network 106. For example, antenna 306 is a wireless Ethernet antenna, and may be part of another linking transceiver. In particular embodiments, LTs 304 may be relatively low power versus antenna/transceiver 306, yet more directional. Antenna/transceiver 306 may project a signal out of a face of frame 108 (e.g., toward client 102, or other hosting device) with sufficient power for such communication. Frame 108 can also include a controller or central processing unit (CPU) to run a routing protocol (e.g., routing information protocol (RIP), open shortest path first (OSPF), interior gateway routing protocol (IGRP), enhanced IGRP (EIGRP), etc.).

Figure 4:
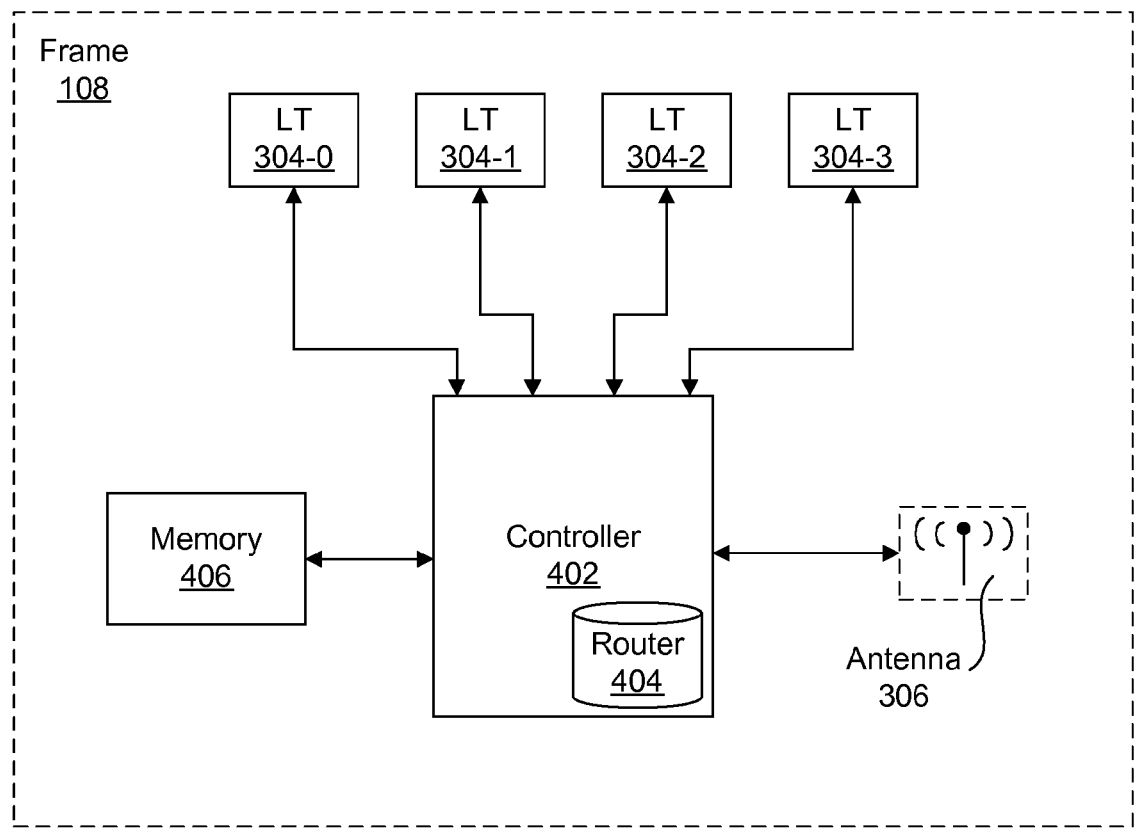
FIG. 4 illustrates example digital picture frame components.

Referring now to FIG. 4, shown are example digital picture frame 108 components. In frame 108, LTs 304-0, 304-1, 304-2, and 304-3 can interface with controller 402. Router software and/or hardware components can be used to implement router 404 in controller 402. Memory 406 can also interface with controller 402, and may be utilized to accept non-volatile memory cards that store digital pictures. Memory 406 can include any type of memory (e.g., dynamic random access memory (DRAM), static RAM (SRAM), non-volatile flash memory, disk memory, etc.). Antenna 306 can also interface with controller 402 for communication with client 102. Further, controller 402 can be used in determination of a lead frame.

Thus, frame 108 can function as a router (e.g., a wireless router), and may include multiple interfaces. In certain embodiments, "convergence" can be attained using the router function, whereby each router 404 in digital frame network 106 has a determined view of the other routers in the network. For example, such a routing function may be a software function, where LTs 304 may be implemented in hardware. Thus, router 404 (e.g., router software capability) may reside in controller 402, LTs 304 can transmit and receive data content, and each LT 304 may include an antenna (e.g., for wireless Ethernet) therein.

Figure 5:
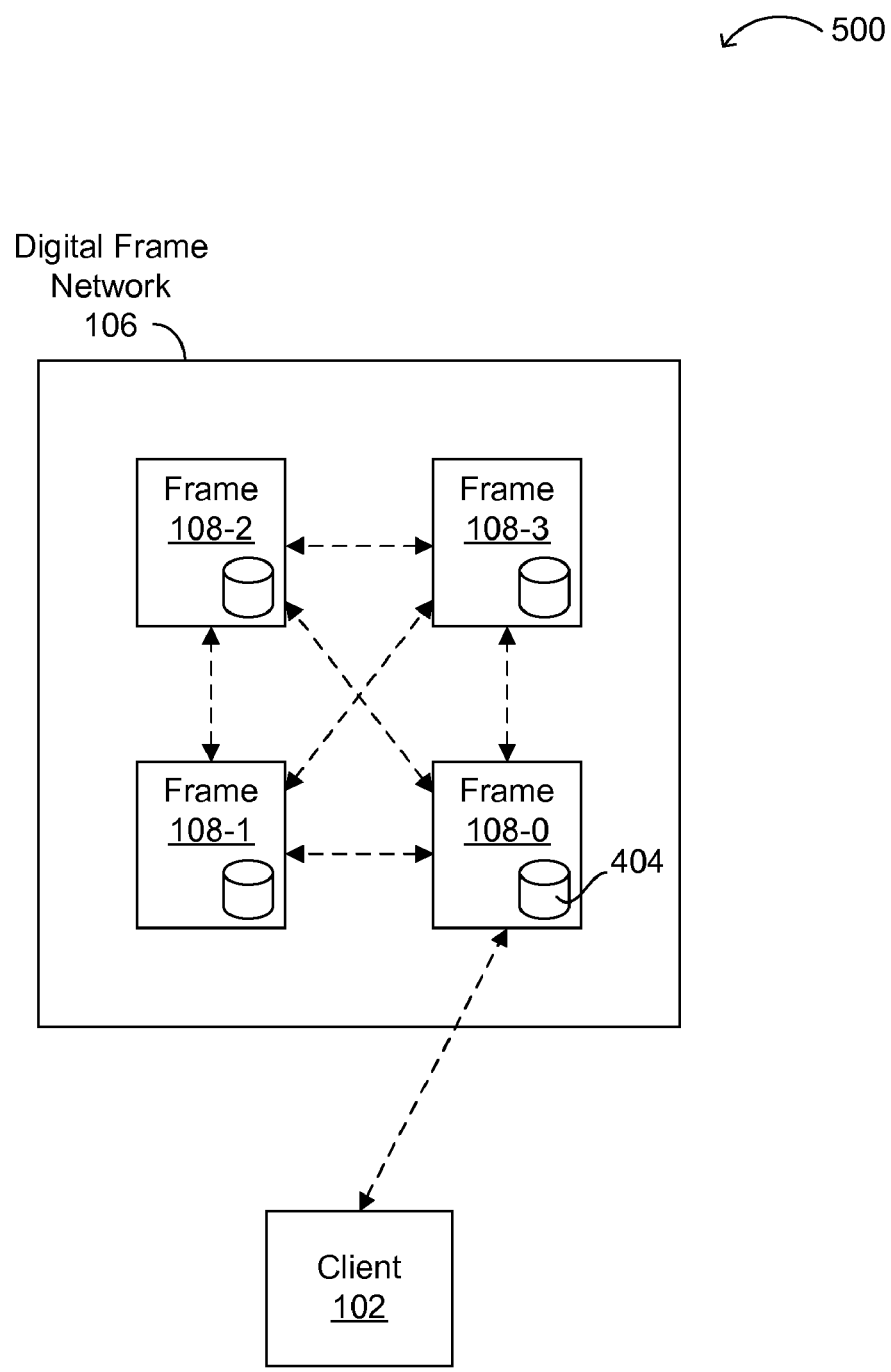
FIG. 5 illustrates an example wireless frame network and software client arrangement.

Referring now to FIG. 5, shown (500) is an example wireless frame network and software client arrangement. Digital frame network 106 can include frames 108, with each frame having router functionality 404. Each frame 108 can include a wireless connection to other frames (e.g., frame 108-1 can interface with frames 108-0, 108-2, and 108-3). Client 102 can interface wirelessly with lead frame 108-0.

Once arranged and powered on, frames 108 can auto-sense each other and form a two-dimensional or three-dimensional frame inter-network view. This can be accomplished with a relatively simple small-network routing protocol, such as RIPv1. Further, to accommodate layer 2 and layer 3 networking, each wireless interface may have a unique MAC address. The lead frame (e.g., 108-0) can propagate IP layer information from client 102 to the other frames (e.g., 108-1, 108-2, and 108-3), and a layer 3 discovery process can be initiated. In this fashion, wireless digital picture frame 108 can be linked to its neighbor frames.

Next, frames 108 can form a network and determine a frame topology using a routing protocol (e.g., RIP). After convergence, this information (e.g., RIP table) may be sent to client 102 from lead frame 108-0. The model information (e.g., manufacturer, dimensions, aspect ratio, etc.) for each frame 108 may also be sent, such as by using the router 404/frame 108 host name, or by a MAC address lookup within software client 102. Software client 102 can then form a visual topology of digital frame network 106, and a representation thereof may be drawn in a window of client 102.

In particular embodiments, as frames 108 are turned on, the frames find each other in an auto-discovery process. Appropriate signals may be propagated, and report or return signals may be received in each frame for determining relative locations. Relative directions can be determined by return signal strength comparisons and analysis (e.g., via each LT 304 in controller 402). For example, standard routing protocols (e.g., OSPF, or any suitable link-state routing protocol) may be used in this discovery process. During this process, MAC and IP addresses may be exchanged, as in router networks. In this fashion, a topology of the network can be formed using directional linking transceivers in each frame 108.

MAC addresses are typically unique, and are provided in frames 108, while IP addresses are dynamic. Thus, a DHCP server may be included in client 102 in order to provide IP addresses to frames 108 such that the frames can communicate over layer 3. In particular embodiments, client 102 and/or a designated one of frames 108, can create an appropriate file to be pushed out to frames 108 in digital frame network 106. Particular embodiments can also support a shuffle function across multiple frames 108, whereby client 102 can send a "shuffle" command to a particular frame, when that frame has a plurality of pictures already loaded therein.

Figure 6:
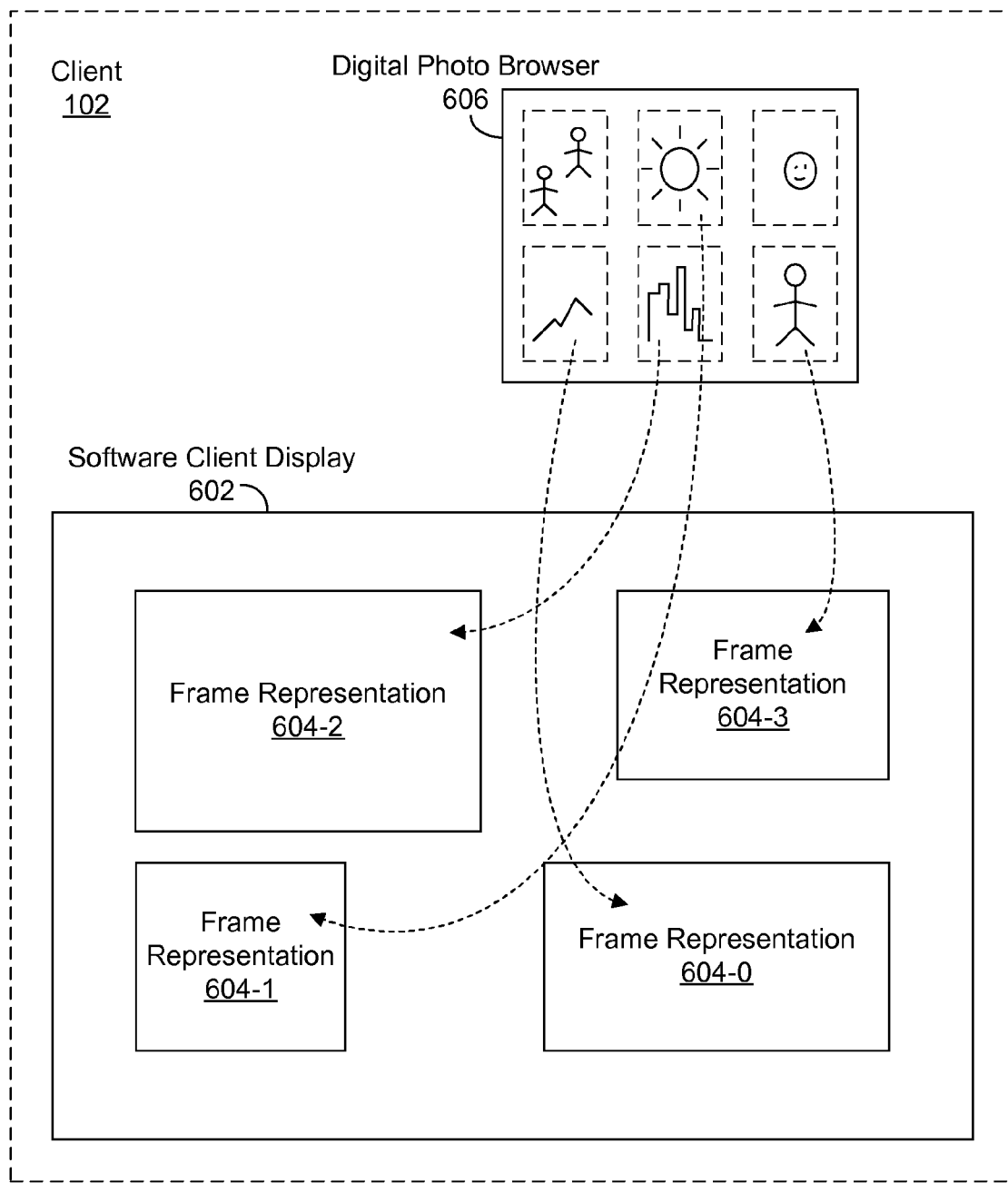
FIG. 6 illustrates an example software client display operation.

Referring now to FIG. 6, shown is an example software client display operation, as implemented on client 102. Digital photo browser 606 can include example digital picture files, as shown. Software client display 602 can include representations 604 corresponding to each of frames 108. Representations 604 can include various information (e.g., size, shape, manufacturer, storage capacity, etc.) about each of frames 108. A user can then click and drag/drop or otherwise copy/move digital picture files to appropriate frame representations 604. For example, a mountain scenery picture can be dropped into frame representation 604-0, a sun picture can be dropped into frame representation 604-1, a city skyline picture can be dropped into frame representation 604-2, and a picture of a person can be dropped into frame representation 604-3.

When frames 108 are physically rearranged (e.g., due to different dimensions, preferences, etc.), digital frame network 106 can converge again using the selected routing protocol (e.g., RIPv1), and a new frame topology can be discovered and reported to software client 102 for updating software client display 602. As discussed above, when the representation in software client display 602 is pushed out from client 102, data routing of picture content occurs in accordance with the routing capability of frames 108. As such, a pushed picture can pass to a first point of contact (e.g., lead frame 108-0), and then be routed to a destination picture frame. Thus, each frame 108 can operate like a router in a data network, which allows for design advantages, simplified communication via a lead frame, and overall bandwidth usage efficiency.

Figure 7:
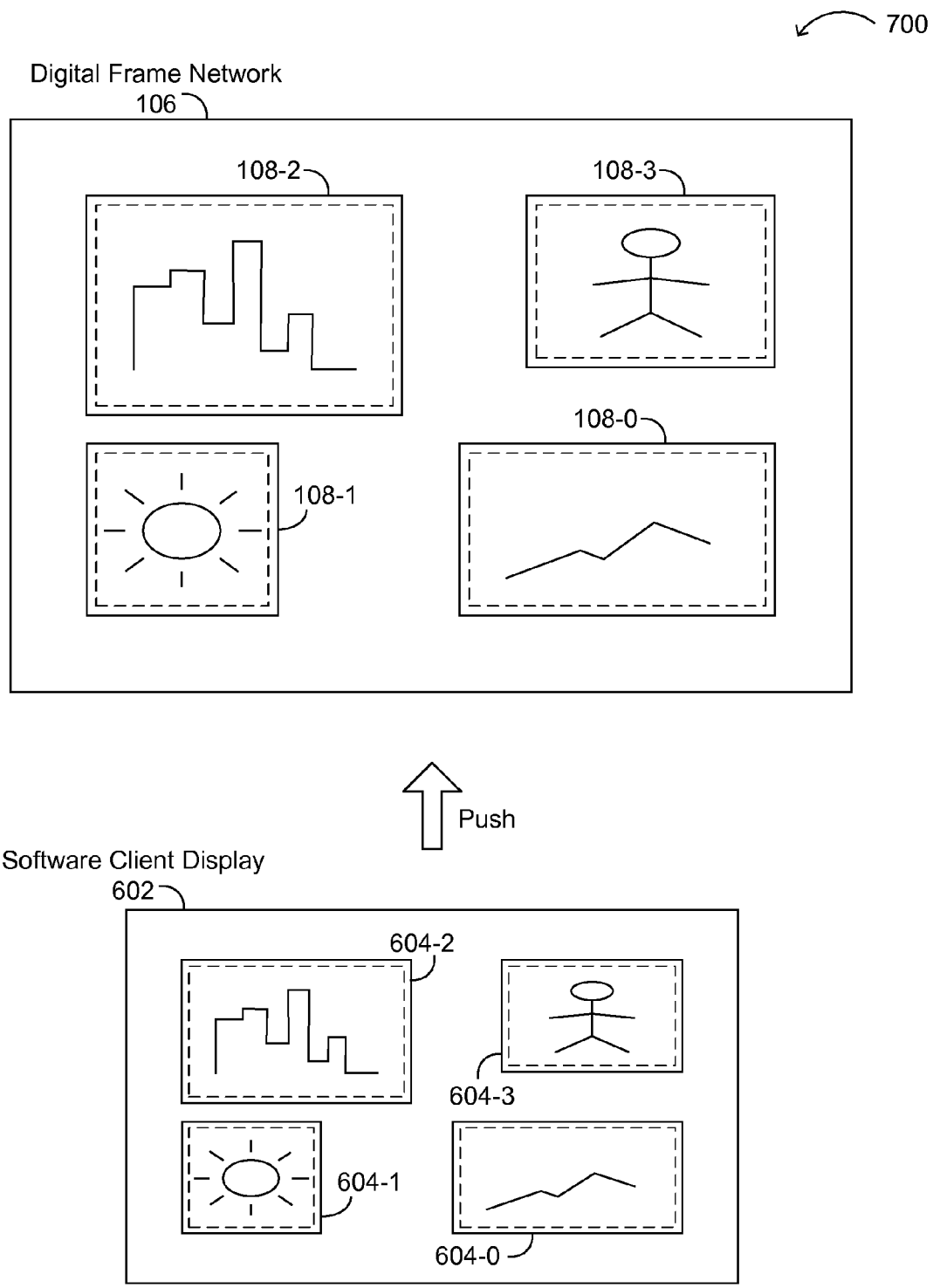
FIG. 7 illustrates an example push operation to update physical digital picture frames.

Referring now to FIG. 7, shown (700) is an example push operation to update physical digital picture frames. Using the push operation in particular embodiments, content seen in frame representations 604 in software client display 602 of client 102 can be pushed (e.g., by clicking an "upload" button) to corresponding physical digital picture frames 108 in digital frame network 106. For example, the mountain scenery picture in frame representation 604-0 can be pushed into corresponding frame 108-0, the sun picture in frame representation 604-1 can be pushed into corresponding frame 108-1, the city skyline picture in frame representation 604-2 can be pushed into corresponding frame 108-2, and the picture of the person in frame representation 604-3 can be pushed into corresponding frame 108-3. Accordingly, after a user clicks an "upload" or similar button in client 102 to initiate a push operation, updated digital files may be transported to digital frame network 106 (e.g., via wireless communication), and the corresponding physical photo arrangement can reflect what is viewable in software client display 602.

Figure 8:
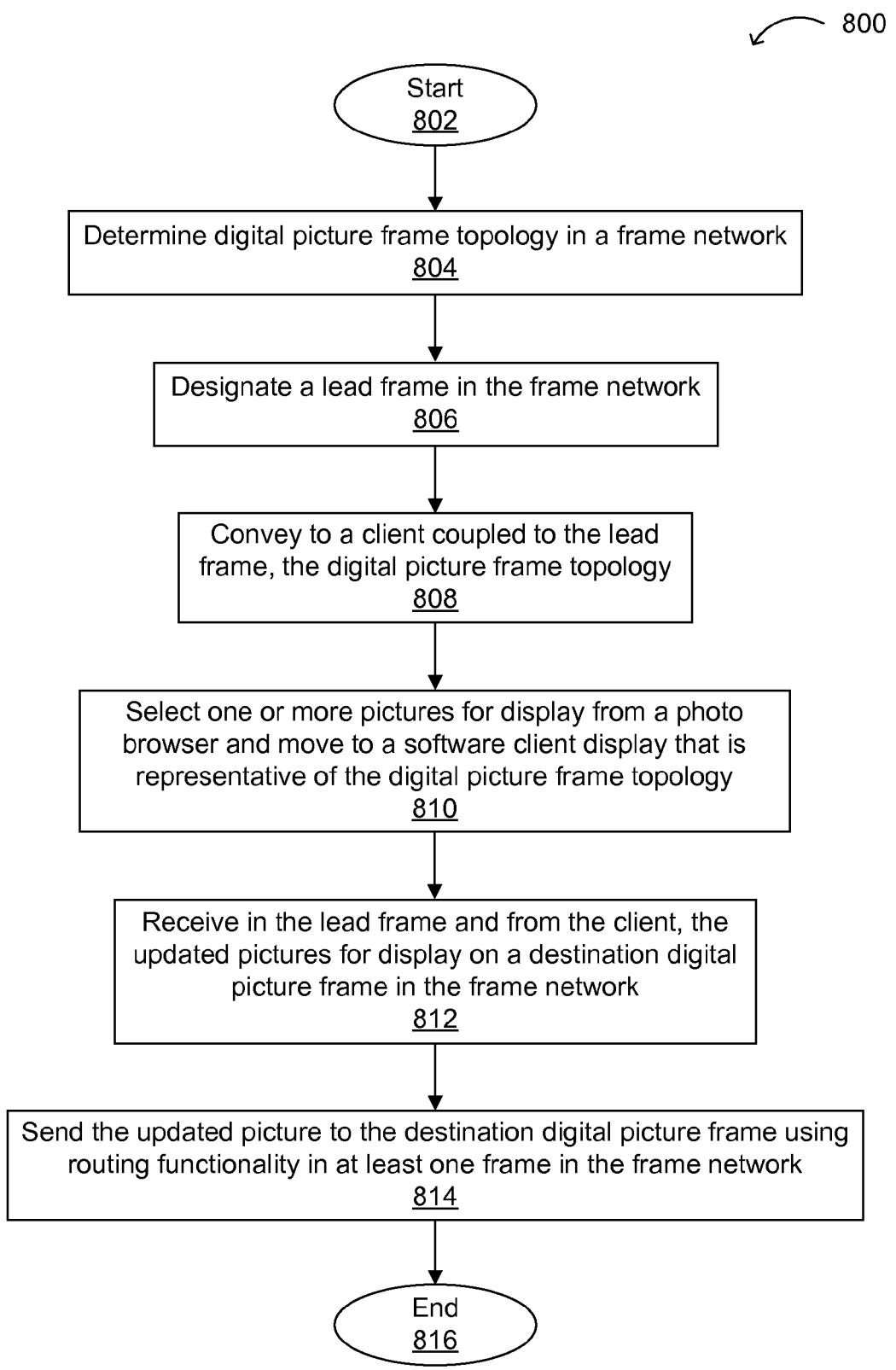
FIG. 8 illustrates a flow diagram of an example method of controlling a group of digital picture frames.

Referring now to FIG. 8, shown (800) is a flow diagram of an example method of controlling a group of digital picture frames. The flow begins (802), and a topology of digital picture frames in a frame network can be determined (804). A lead frame in the frame network can be designated (806) or otherwise selected (e.g., using MAC address comparisons), and the digital picture frame topology can be conveyed via the lead frame to a client (e.g., a software client in a remote laptop device) coupled (e.g., wirelessly) to the lead frame (808). One or more pictures for display can be selected (e.g., in client 102) from a photo browser (e.g., 606), and moved to a software client display (e.g., 602) that is representative of the digital picture frame topology. The lead frame can receive from the client the updated pictures or other content for display on a destination digital picture frame in the frame network (812). The updated picture (or multiple pictures) can then be sent to the destination digital picture frame using routing functionality contained in the frames (814), thus completing the flow (816).

In a video wall application, various display portion sizes (e.g., 4×4, 10×4, 10×16, etc.) can be accommodated. Thus, in order to control different display portions, or build a video wall of any suitable shape, the video wall portions can be arranged similar to frames in digital frame network 106. Thus, a video display can be updated via client 102 with a suitable corresponding software client display 602. Further, client 102 and/or frames 108 can include a digital media viewer or player, such as a set-top box (STB), cable modem (CM), video player, or any other suitable type of content playing or converting device.

As one particular example, a streaming server can provide control signals (e.g., a multicast MP2TS (MPEG-2 transport stream)) and clock signaling to digital media receivers in, or associated with, client 102. However, any broadcast or multicast stream over an IP network, such as a satellite stream encapsulated in IP or any other source, can be used as a source of a content stream (e.g., a video stream) instead of a streaming server.

Particular embodiments combine wireless Ethernet-enabled frames with a software client to enable a user to physically adjust or station an arrangement of digital picture frames, and then control digital pictures for display on the frames using a software client. As discussed, each intelligent digital picture frame may be equipped with low-power wireless Ethernet ports, and with basic routing capabilities that can be used to discover other frames in a physical (e.g., wall, mantle, etc.) arrangement. In this fashion, physical frames or sub-walls do not have to be moved in order to change the arrangement content.

Although the description has been described with respect to particular embodiments thereof, these particular embodiments are merely illustrative, and not restrictive. For example, any digital media content, such as video or still digital pictures, as well as digital picture functions (e.g., shuffle arrangements) can be utilized in particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A method, comprising:
powering on a plurality of digital picture frames in a digital frame network;
for each operational frame in the plurality of digital picture frames, transmitting wireless signals to other frames in the digital frame network and receiving wireless signals from other operational frames in the digital frame network, using at least four linking transceivers that are placed in suitable locations within a perimeter of the frame and which are capable of transmitting and receiving data content;
determining a topology of the plurality of digital picture frames in the frame network, where the topology is determined in each digital picture frame based on the signals received from other frames in the digital frame network;
selecting a lead picture frame from among the plurality of digital picture frames by at least one of: automatic election based on an address of each digital picture frame, and setting a switch in the lead picture frame;
gathering, by the lead picture frame, the topology information for the plurality of digital picture frames in the digital frame network;
enabling an antenna in the lead picture frame and establishing a communication link between the lead picture frame and a remote client using the remote antenna;
sending the digital picture frame topology information by the lead picture frame and to the client over the established communication link;
receiving, in the client, the topology information from the lead picture frame over the established communication link and selecting, in the client, media content for display on a plurality of digital picture frames in the digital frame network, based on the received topology information;
sending the media content for display from the client to the lead picture frame over the established communication link;
receiving in the lead picture frame and from the client over the established communication link, media content for display on a plurality of destination digital picture frames in the frame network; and
routing the received media content to the plurality of destination digital picture frames using router functionality, wherein each of the plurality of digital picture frames is equipped to support the router functionality, and the media content is routed to the destination digital picture frames using the router functionality in at least one of: the lead picture frame and a digital picture frame in the plurality of the digital picture frames.

2. The method of claim 1, wherein wireless communication is used for the determining of the topology, sending of the topology, and receiving of the media content for display.

3. The method of claim 1, wherein the determining the topology comprises using a routing information protocol (RIP) routing protocol.

4. The method of claim 1, wherein the determining the topology comprises using an open shortest path first (OSPF) routing protocol.

5. The method of claim 1, wherein the determining the topology comprises using a gateway routing protocol (GRP).

6. The method of claim 1, wherein the media content comprises a digital picture.

7. The method of claim 1, wherein the media content is received at the lead picture frame using a push command from a client at the content source.

8. The method of claim 1, wherein the determining the topology comprises sending and receiving directional signals via one or more of at least four linking transceivers on each of the two or more digital picture frames.

9. The method of claim 1, wherein the determining the topology comprises exchanging media access control (MAC) and Internet protocol (IP) addresses between at least two of the two or more digital picture frames.

10. A digital picture frame, comprising:
one or more linking transceivers positioned within a perimeter of the digital picture frame, wherein the linking transceivers are capable of transmitting and receiving data content;
an antenna configured to communicate with a content source outside of a digital frame network that includes the digital picture frame only when the digital picture frame is a lead picture frame, wherein the lead picture frame is selected by using a method selected from a group including automatic election based on an address of the digital picture frame relative to a second digital picture frame, and setting a switch in the lead picture frame; and
a controller having router capability configured therein, wherein the controller is configured to:
communicate with the linking transceivers for determination of a topology of the digital frame network which includes the digital picture frame;
send the topology to the content source outside of the digital frame network when the digital picture frame is the lead picture frame;
receive media content for display on the digital picture frame when the digital picture frame is a destination frame; and
route media content to a second digital picture frame using the router capability when the second digital picture frame is destination frame for the media content.

11. The digital picture frame of claim 10, wherein the router capability comprises a routing information protocol (RIP).

12. The digital picture frame of claim 10, wherein the router capability comprises an open shortest path first (OSPF) protocol.

13. The digital picture frame of claim 10, wherein the router capability comprises a gateway routing protocol (GRP).

14. The digital picture frame of claim 10, wherein the media content comprises a digital picture.

15. The digital picture frame of claim 10, wherein at least one of the content source outside of the digital frame network and the lead picture frame comprises a dynamic host configuration protocol (DHCP) server.

16. The digital picture frame of claim 10, further comprising a memory configured to store a digital picture.

17. The digital picture frame of claim 10, wherein the address of the digital picture frame used for automatically selecting the lead picture frame comprises a media access control (MAC) address.

18. An apparatus, comprising:
one or more processors; and
logic encoded in one or more non-transitory tangible media for execution by the one or more processors, and when executed operable to:
receive a topology of two or more digital picture frames in a digital frame network from a lead picture frame; wherein:
the lead picture frame is selected from among the two or more digital picture frames by using a method selected from a group including automatic election based on an address of each digital picture frame and setting a switch in the lead picture frame; and
each digital picture frame comprises one or more linking transceivers positioned within a perimeter of the digital picture frame for transmitting and receiving data content, including determining the topology of the two or more digital picture frames;
select a media content for display in a representation of the topology of the two or more digital picture frames in the digital frame network; and
send the media content to the lead picture frame for display on a destination digital picture frame in the digital frame network, wherein the media content is routed to the destination digital picture frame based on the topology, the lead picture frame participating within the digital frame network using a routing protocol configured in the lead picture frame.

19. The apparatus of claim 18, wherein the logic when executed to select the media content for display is further operable to browse through a plurality of available digital pictures to select a digital picture for display.

20. The apparatus of claim 18, wherein the logic when executed to send the media content for display is further operable to use a wireless network coupling to the lead picture frame.

* * * * *